(12) United States Patent
Lee

(10) Patent No.: US 11,913,566 B2
(45) Date of Patent: Feb. 27, 2024

(54) FUEL TANK ISOLATION VALVE OR VEHICLE

(71) Applicant: Hyundai Kefico Corporation, Gyeonggi-Do (KR)

(72) Inventor: Du Seok Lee, Gyeonggi-do (KR)

(73) Assignee: Hyundai Kefico Corporation, Gyeonggi-do (KR)

( * ) Notice: Subject to any disclaimer, the term of this patent is extended or adjusted under 35 U.S.C. 154(b) by 0 days.

(21) Appl. No.: 17/940,155

(22) Filed: Sep. 8, 2022

(65) Prior Publication Data
US 2023/0085374 A1 Mar. 16, 2023

(30) Foreign Application Priority Data
Sep. 8, 2021 (KR) .................. 10-2021-0119514

(51) Int. Cl.
*F16K 31/06* (2006.01)
*F16K 47/02* (2006.01)
*F02M 25/08* (2006.01)

(52) U.S. Cl.
CPC .......... *F16K 31/0655* (2013.01); *F16K 47/02* (2013.01); *F02M 2025/0845* (2013.01)

(58) Field of Classification Search
CPC .................................................. F16K 31/0655
See application file for complete search history.

(56) References Cited

U.S. PATENT DOCUMENTS

| 10,041,401 | B2 * | 8/2018 | Lenk ................. F02M 35/10157 |
| 11,047,500 | B2 * | 6/2021 | Zhou .................... F16K 31/0655 |
| 2018/0370351 | A1 * | 12/2018 | Vulkan ............. B60K 15/03519 |

FOREIGN PATENT DOCUMENTS

| JP | 2898906 B2 | 6/1999 |
| JP | 4088741 B2 | 5/2008 |
| JP | 2017-057935 A | 3/2017 |
| KR | 10-2000-0057204 A | 9/2000 |

OTHER PUBLICATIONS

Office Action dated Jul. 1, 2023 in correspoonding Korean Application No. 10-2021-0119514.
Office Action dated Aug. 28, 2023 in corresponding Korean Application No. 10-2021-0119514.

\* cited by examiner

*Primary Examiner* — Eric Keasel
(74) *Attorney, Agent, or Firm* — Fox Rothschild LLP

(57) ABSTRACT

The present disclosure relates to a fuel tank isolation valve of a vehicle, wherein the first armature and the second armature are connected in such a manner that there is no clearance therebetween, and a spring compression amount securing groove is formed on the upper surface of the guide. In a preferred finished valve assembly state, the position of the first armature in a valve-off state can be constant, and the movement of the first armature does not significantly occur, thereby noise, vibration, and wear are inhibited or prevented.

7 Claims, 7 Drawing Sheets

FUEL TANK ISOLATION VALVE OR VEHICLE

CROSS-REFERENCE TO RELATED APPLICATIONS

The present application claims priority to Korean Patent Application No. 10-2021-0019514 filed Sep. 8, 2021, the entire contents of which is incorporated herein for all purposes by this reference.

1. FIELD

In one aspect, the present disclosure relates to a fuel tank isolation valve of a vehicle, and in a preferred aspect relates to a fuel tank isolation valve of a vehicle, which is installed between a fuel tank and a canister and configured to open a flow path when necessary and normally maintain the fuel tank in a closed state.

2. BACKGROUND

Fuel evaporation gas generated from a vehicle's fuel tank contributes to air pollution as one of the air pollutants, and thus it is prohibited to discharge it directly into the atmosphere. Therefore, in a vehicle, the fuel evaporation gas is adsorbed and stored in a canister containing activated carbon therein, and then supplied to a combustion chamber of the engine for combustion.

The fuel tank and the canister of the vehicle, and the canister and an intake portion of an engine (an intake manifold or a throttle body) are connected by pipe lines. A purge control solenoid valve (PCSV) is installed between the canister and the intake portion of the engine to control the opening and closing of a fuel evaporation gas purge line.

In addition, a fuel tank isolation valve (FTIV) is installed in a fuel evaporation gas discharge pipe between the fuel tank and the canister.

In general, the fuel tank isolation valve is a solenoid valve operated and controlled by an electronic control unit. A conventional fuel tank isolation valve includes, as shown in FIG. 1, a first armature 2 operated by an electromagnetic force of a solenoid coil, and a second armature 3 connected to a lower end of the first armature 2 and operated together. A piston 4 is installed outside the second armature 3 to open and close a canister-side flow path 1b together with the second armature 3. Reference numerals 1 and 1a denote a valve housing and a fuel tank-side flow path, respectively.

A first spring 6 is installed between a guide 5 and the second armature 3 to push the second armature 3 downward, and the piston 4 is elastically supported by a second spring 7 and receives a force upward.

Since the fuel tank isolation valve needs to be maintained normally in a closed state, the first spring 6 needs to be compressed by a predetermined amount in an assembled state as described above, and tightness is maintained between the first armature 2 and the piston 4 and between the piston 4 and a periphery of an inlet of the canister-side flow path 1b by a compression reaction force thereof.

In order to secure a spring compression amount of the first spring 6 as described above simultaneously with the product assembly, there is clearance P in a connection portion of the first armature 2 and the second armature 3 so that they may move relative to each other. By having the clearance P, the first spring 6 can be compressed when an armature assembly (the first armature 2, the second armature 3, the guide 5, the first spring 6) is assembled between a solenoid part and the valve housing 1, thereby a spring reaction force required for a valve tightness is generated.

However, according to the conventional structure as described above, due to the possible relative movement of the first armature 2 and the second armature 3, there was a problem in that an axial movement of the first armature 2 occurs in a finished product assembly state.

Such the movement of the first armature 2 results in an axial position variation of the first armature 2, an intensity of effective magnetic force generated when the valve is on is not constant, thereby reducing an operating performance of the valve.

Also, there was a problem in that noise caused due to a collision between the components in the connection portion of the first armature 2 and the second armature 3 at the time of operating and returning of the armatures according to on/off of the valve.

Also, there was another problem in that even when the valve is off, the first armature 2 vibrates by vibration transmitted from the outside, thereby generating noise, and abrasion occurs due to unnecessary friction with surrounding components.

SUMMARY

In one aspect a fuel tank isolation valve of a vehicle is provided wherein a compression amount of the first spring can be secured at the time of the valve assembling, and the movement of the first armature can be prevented.

In a further aspect, a fuel tank isolation valve of a vehicle is provided that includes a first armature pulled toward an inside of a core by an electromagnetic force generated when a current is supplied to a coil; and a second armature connected to the first armature thus operating in a same direction as the first armature and configured to open and close a flow path, wherein the first armature and the second armature are connected so that there is no clearance in an axial direction.

In preferred aspects, a guide and a first spring is provided between the first armature and the second armature to form an armature assembly, and the first spring is suitably compressed by being supported at both ends thereof by the guide and the second armature, and a spring compression amount securing groove is suitably formed on an upper surface of the guide, wherein the armature assembly is in such a manner that, before assembled inside the fuel tank isolation valve, an undersurface of a body of the first armature is in contact with a floor surface of the spring compression amount securing groove, and, when assembled inside the fuel tank isolation valve, the guide further compresses the first spring by moving toward the second armature while being in contact with the core.

In a preferred configuration, an extension portion is formed on a body of the first armature, a neck portion that is reduced in diameter is formed at an end of the extension portion, and a catching end in that is expanded again in diameter is formed at an end of the neck portion, wherein a connection portion in a cylindrical shape is formed on an upper surface of the second armature, a connection hole is formed in an upper plate of the connection portion, wherein the first armature and the second armature are connected to each other in a state where the neck portion penetrates the connection hole and the catching end is caught by an undersurface of the upper plate of the connection portion, and wherein lengths in an axial direction of the neck portion and the upper plate are the same, so that there is no clearance in the axial direction in the connection portion of the first armature and the second armature.

The second armature is suitably formed in a cylindrical shape, a flow path passing through the second armature is formed, and a relief valve operated by a differential pressure between the fuel tank and the canister is installed inside the second armature.

In a preferred configuration, a number of protrusions are formed along a circumferential surface on an outer peripheral surface of the relief valve, a gap is formed between the outer peripheral surface of the relief valve and an inner peripheral surface of the second armature by the protrusions, so that fuel evaporation gas passes through the gap.

In a preferred configuration, the second armature is suitably inserted into an outer cylinder member, and the outer cylinder member is suitably inserted into a valve housing and supported in the axial direction by a second spring.

In a preferred configuration, a connection portion suitably in a cylindrical shape is suitably formed on an upper surface of the second armature, an opening hole is suitably formed in a side surface of the connection portion, a flow hole is suitably formed through the upper surface of the second armature, a flow hole is suitably formed through a cover coupled to a lower end of the second armature, and a flow hole is suitably formed through a floor surface of the outer cylinder member.

In preferred systems a fuel tank isolation valve of a vehicle is provided where there is no clearance or minimal (e.g. less than 1, 0.9, 0.8, 0.7, 0.6, 0.5, 0.4, 0.3, 0.2 or 01 inches) in the axial direction in the connection portion of the first armature and the second armature, and instead a space for securing a compression amount of the first spring (i.e., a spring compression amount securing groove) is formed.

In preferred systems, the spring compression amount securing groove is suitably formed on the upper surface of the guide, so that it can be possible to secure a required compression amount as the first spring is compressed by the guide at the time of assembling the armature assembly into the valve.

In addition, in preferred systems since there is no or minimal clearance between the first armature and the second armature, it can be possible to prevent or inhibit the first armature from moving in the axial direction in a finished valve assembly state.

In preferred systems, since the position of the first armature in a valve-off state is always or substantially constant, the magnitude of the effective magnetic force generated when the valve is on becomes constant, and as a result, the operation of the valve can be effectively always or substantially stable and uniform.

Further, in preferred systems, since a collision between the components does not occur or is minimized at the connection portion between the first armature and the second armature during operation of the armature assembly according to on/off of the valve, damage to the components of the armatures and noise occurrence can be prevented or inhibited.

Also, in preferred systems, in the valve-off state, since the first armature does not vibrate by vibration transmitted from the outside, noise caused by vibration, friction and consequent wear thereby can effectively be at least substantially reduced or prevented.

In another embodiment, vehicles are provided that comprise an apparatus as disclosed herein.

DETAILED DESCRIPTION

Figure 1:
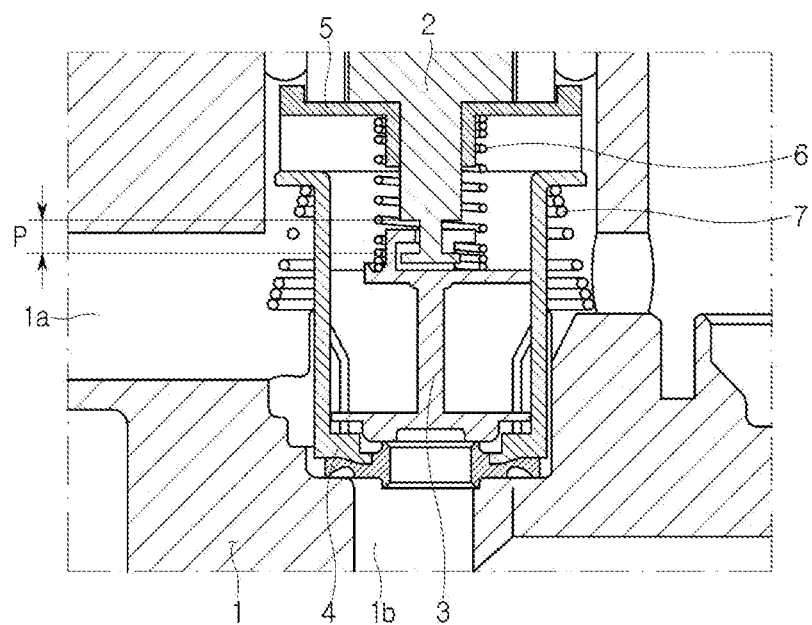
FIG. 1 is a cross-sectional view of a main part of a fuel tank isolation valve in the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The present disclosure may be variously modified and may have various embodiments, and particular embodiments illustrated in the drawings will be described in detail below. However, the description of the exemplary embodiments is not intended to limit the present disclosure to the particular exemplary embodiments, but it should be understood that the present disclosure is to cover all modifications, equivalents and alternatives falling within the spirit and technical scope of the present disclosure. Thicknesses of lines illustrated in the accompanying drawings, sizes of constituent elements, or the like may be exaggerated for clarity and convenience of description.

In addition, the terms used below are defined in consideration of the functions in the present disclosure and may vary depending on the intention of a user or an operator or precedents. Therefore, the definition of the terms should be made based on the entire contents of the present specification.

Hereinafter, a preferable embodiment according to the present disclosure will be described in detail with reference to the accompanying drawings.

Figure 2:
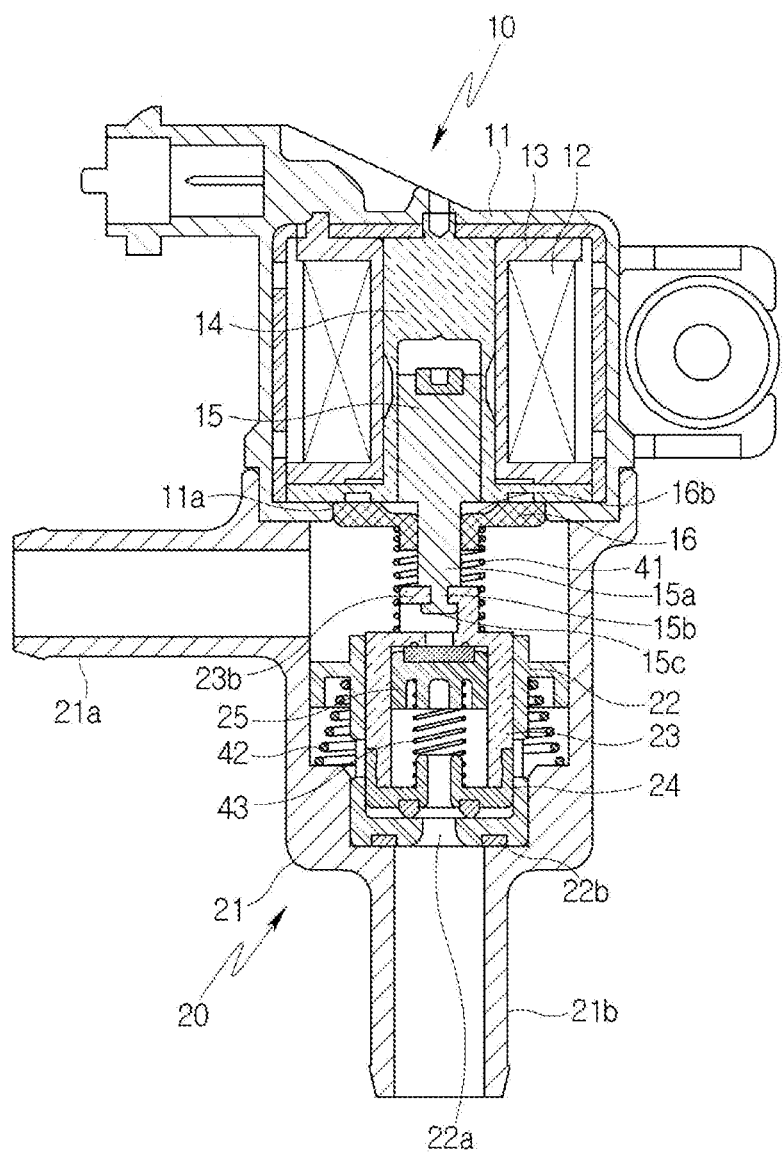
FIG. 2 is a cross-sectional view of a fuel tank isolation valve according to the present disclosure.

As shown in FIG. 2, the fuel tank isolation valve according to the present disclosure includes a solenoid part 10 and a valve part 20.

In the depicted embodiment, the solenoid part 10 includes, inside a solenoid housing 11, a coil 12, a bobbin 13 on which the coil 12 is wound, a core 14 inserted into the bobbin 13, a first armature 15 that is inserted into the core 14 and is pulled to an inside (an upward direction in the figure) of the core 14 when a current is supplied to the coil 12.

The first armature 15 is suitably pre-assembled when assembling an "armature assembly" to be described below, and is inserted into the core 14 when the solenoid part 10 and the valve part 20 are assembled.

A connector 17 including a terminal 17a connected to the coil 12 is suitably formed on one side of the solenoid housing 11 to supply a current to the coil 12.

The valve part 20 includes a valve housing 21 coupled to one side of the solenoid housing 11, an outer cylinder member 22 installed inside the valve housing 21, and the "armature assembly" is suitably installed inside the outer cylinder member 22.

The valve housing 21 suitably has a substantially cylindrical shape, and a fuel tank-side connecting pipe 21a to which a fuel tank-side pipe line is connected is suitably formed at one side of an outer peripheral surface thereof, and a canister side-connecting pipe 21b to which a canister-side pipe line is connected is formed at one end of one side thereof. The fuel tank-side connecting pipe 21a and the canister-side connecting pipe 21b have a mutually orthogonal relationship.

The outer cylinder member 22 is suitably installed so as to be slidable up and down along an inner peripheral surface of the valve housing 21, and suitably is elastically supported upward by a second spring 42, a flow hole 22a is suitably formed penetrating a center of a floor portion thereof. A sealing member 22b is suitably provided on an undersurface of the floor portion. Although not illustrated, between the outer cylinder member 22 and the valve housing 21, suitably there exists a flow path such as a flow hole, a gap or the like, through which the fuel evaporation gas flows. Therefore, when the entire armature assembly is raised by an electromagnetic force of the solenoid part 10, the fuel evaporation gas suitably may move through the flow path between the outer cylinder member 22 and the inner peripheral surface of the valve housing 21.

Figure 3:
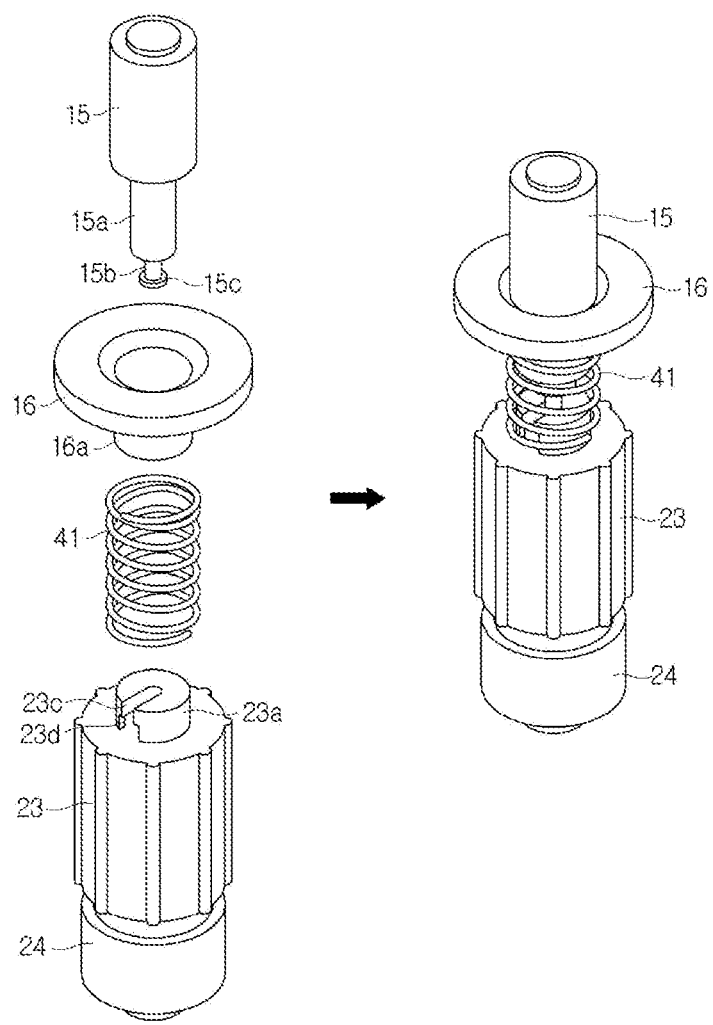
FIG. 3 is an exploded view and an assembly view of an armature assembly that is a main configuration of the present disclosure.
Figure 4:
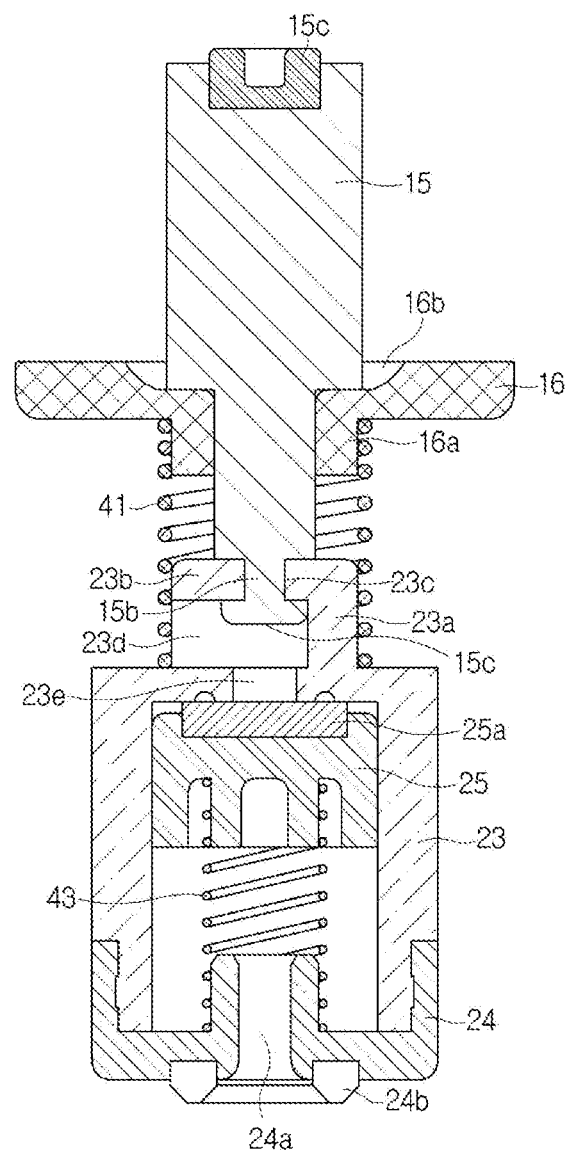
FIG. 4 is a cross-sectional view of the armature assembly.

The "armature assembly" suitably includes the first armature 15, a second armature 23 suitably connected to the first armature 15, and a cover 24 suitably coupled to the second armature 23, a guide 16 through which the first armature 15 penetrates, and a first spring 41 suitably installed between the guide 16 and the second armature 23, as shown in FIGS. 3 and 4.

An extension portion 15a penetrating a hole formed in a center of the guide 16 is suitably formed at a lower end of a body of the first armature 15, a neck portion 15b that is suitably reduced in diameter than the extension portion 15a is formed at a lower end of the extension portion 15a, and a catching end 15c in a disk shape is suitably formed as to increase in diameter again at a lower end of the neck portion.

In a preferred configuration, the second armature 23 is suitably a cylindrical member with a lower portion thereof being open, a connection portion 23a suitably in a cylindrical shape is suitably formed at an upper end thereof. In a center of an upper plate 23b of the connection portion 23a, a connection hole 23c is suitably formed as to penetrate in a vertical direction, and the connection hole 23c suitably extends in a radial direction of the connection portion 23a and is suitably opened to an outer peripheral surface of the connection portion 23a. In addition, an opening hole 23d communicating with the connection hole 23c is suitably formed in the outer peripheral surface of the connection portion 23a. In addition, a flow hole 23e is suitably formed in a floor surface of inside the connection portion 23a, that is, in a center of an upper surface of the second armature 23.

Accordingly, in a preferred configuration, the neck portion 15b and the catching end portion 15c of the first armature 15 suitably may be inserted from a side surface of the connection portion 23a of the second armature 23 through the connection hole 23c and the opening hole 23d into the connection portion 23a. As a result, the upper plate 23b of the connection portion 23a is suitably inserted to the neck portion 15b of the first armature 15 as shown in FIG. 4, and the catching end 15c of the first armature 15 is caught by a lower surface of the upper plate 23b of the connection portion 23a, i.e., a periphery portion of the connection hole 23c. Therefore, the first armature 15 and the second armature 23 suitably are mutually constrained in the axial direction (an operation direction of the armature) and operate together.

In a preferred configuration, the neck portion 15b of the first armature 15 and the upper plate 23b of the connection portion 23a of the second armature 23 suitably have the same axial length. Therefore, the upper plate 23b of the connection portion 23a is suitably fitted into a groove around the neck portion 15b in the axial direction without any clearance, and accordingly, the first armature 15 and the second armature 23 are unable or at least substantially unable to move relative to each other in the axial direction.

In a preferred configuration, the guide 16 and the first spring 41 suitably are installed between the first armature 15 and the second armature 23. To this end, the extension portion 15a of the first armature 15 suitably is inserted into a center hole of the guide 16 before the first armature 15 and the second armature 23 suitably are coupled, and the first spring 41 is suitably inserted from below to an outer side of the extension portion 15a, and thus an upper end of the first spring 41 is suitably fitted to the outer periphery of a boss 16a formed on an undersurface of the guide 16. In that state, the neck portion 15b and the catching end 15c of the first armature 15 to an outer side of the first spring 41 are suitably exposed by compressing a lower end of the first spring 41, and then coupled to the connection portion 23a of the second armature 23. After the coupling, the first spring 41 is suitably restored and is fitted at the lower end to the outer periphery of the connection portion 23a.

In addition, a spring compression amount securing groove 16b is suitably formed on an upper surface of the guide 16. The spring compression amount securing groove 16b suitably is a groove in a disk shape and having a larger diameter than the body of the first armature 15 so that the body of the first armature 15 can be inserted and seated therein. A boundary surface of the spring compression amount securing groove 16b is preferably formed as an inclined surface having a shape in which the diameter increases progressively upwards from a floor surface of the groove in order to prevent an interference with the body of the first armature 15b.

When the coupling of the first armature 15 and the second armature 23 has been completed, the first spring 41 may be compressed a little so that it is in a state where both ends thereof are supported by the undersurface of the guide 16 and the upper surface of the second armature 23, respectively. Therefore, since the guide 16 is pushed toward the body of the first armature 15 by a restoring force of the first spring 41, a lower surface of the body of the first armature 15 may be in close contact with the floor surface of the spring compression amount securing groove 16b of the guide 16.

In a preferred configuration, the second armature 23 suitably is a cylindrical part and suitably has a lower end that is open. A relief valve 25 and a third spring 43 supporting the relief valve 25 suitably may be inserted into the second armature 23 through the opened lower end.

In a preferred configuration, after the relief valve 25 and the third spring 43 are suitably inserted into the second armature 23, the cover 24 is suitably coupled to an end of the second armature 23. A lower end of the third spring 43 suitably is fitted to an outer periphery of the boss formed on an inner center of the cover 24, and an upper end of the third spring 43 is suitably inserted into a circular spring groove formed on the undersurface of the relief valve 25. In a preferred configuration, therefore, the relief valve 25 is suitably always pushed upward by the third spring. 43, and thus blocks the flow hole 23e. A disk-shaped sealing member 25a is suitably provided on an upper surface of the relief valve 25, so that the flow hole 23e may be more reliably blocked.

In the center of the cover 24, a flow hole 24a is suitably formed penetrating the boss, and a sealing member 24b having a circular ring shape and surrounding the periphery of the flow hole 24a is suitably provided on an undersurface of the cover 24. The sealing member 24b is suitably in contact with an inner floor surface of the outer cylinder member 22 in a valve assembled state to block a gap between the outer cylinder member 22 and the second armature 23.

The cover 24 suitably may be coupled to the second armature 23 by a structure of a catching groove and a catching protrusion, a screw structure, or the like.

Although not illustrated, in a preferred configuration, on an outer peripheral surface of the relief valve 25, protrusions suitably are formed at regular intervals in a circumferential direction, and the protrusions suitably are brought into contact with an inner peripheral surface of the second armature 23 and slidingly move in the vertical direction. In preferred configuration, therefore, a gap may exist between the outer peripheral surface of the relief valve 25 and the inner peripheral surface of the second armature 23 by the protrusions, and the fuel evaporation gas suitably may move through the gap. In a preferred configuration, therefore, when the relief valve 25 moves in a direction of compressing the third spring 43 due to a differential pressure relationship between the fuel tank and the canister, a flow path passing through the opening hole 23d, the flow hole 23e, the gap, the flow hole 24a and the flow hole 22a is suitably formed so that fuel evaporation gas can move from the fuel tank to the canister.

Figure 5:
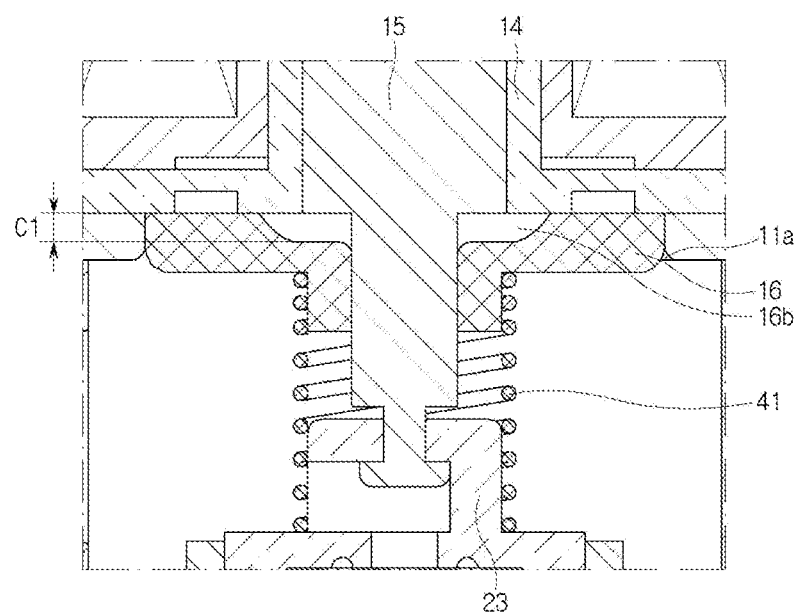
FIG. 5 is a view illustrating an installed state of the armature assembly in the valve.

In a preferred configuration, as shown in FIGS. 2 and 5, the armature assembly (in an assembled state as shown in FIG. 4) is suitably inserted into the outer cylinder member 22 inserted earlier into the valve housing 21. In this state, the solenoid housing 11 and the valve housing 21 suitably are coupled to each other so that the first armature 15 is inserted into the core 14 of the solenoid part 10.

In a preferred configuration, the guide 16 is suitably inserted through a circular seating hole 11a formed in a coupling surface (the undersurface with reference to FIG. 2) of the solenoid housing 11 and moves toward the second armature 23 while being in close contact with an undersurface of the core 14, thereby further compressing the first spring 41. The compression amount suitably is the compression amount of the first spring 41 that meets the fuel tank isolation valve design specification, and the fuel tank isolation valve may normally perform a flow path opening/closing operation in such a manner that the second armature 23 and the outer cylinder member 22 move in the axial direction by the elastic force relationship between the first spring 41 and the second spring 42 and the electromagnetic force generated according to on/off of the solenoid part 10.

On the other hand, assuming that the spring compression amount securing groove 16b is not formed on the upper surface of the guide 16, the position of the guide 16 is not in a state of FIG. 4 (a state where the floor surface of the spring compression amount securing groove 16b of the guide 16 suitably is in contact with an undersurface of the body of the first armature 15), instead is in a state where the upper surface of the guide 16 is in contact with the undersurface of the first armature 15, which is a state where the guide 16 compresses the first spring 41 in advance before installing the armature assembly inside the fuel tank isolation valve, and therefore when the armature assembly as such is assembled inside the fuel tank isolation valve, it will result in a problem of occurring a gap between the guide 16 and the core 14.

As described above, when a gap occurs between the guide 16 and the core 14, whenever the first armature 15 rises according to on of the solenoid part 10, the guide 16 rises together and collides with the undersurface of the core 14, thereby impairing the valve operation performance and causing noise and vibration, and accordingly the valve cannot be used as a normal fuel tank isolation valve.

Through the above assumption, the effect of the spring compression amount securing groove 16b can be confirmed.

Figure 6:
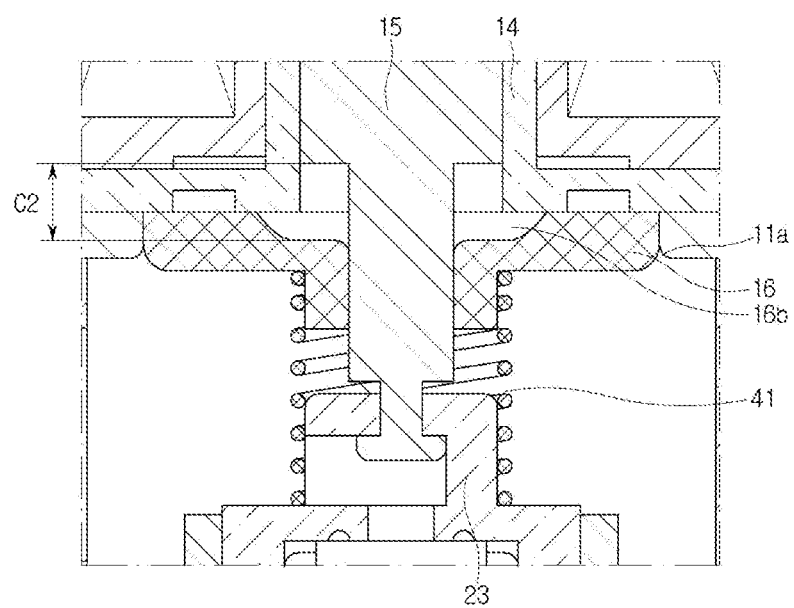
FIG. 6 is a view illustrating an installed state of the armature assembly in the valve, as shown in FIG. 5, in which a compression amount of a first spring is different.
Figure 7:
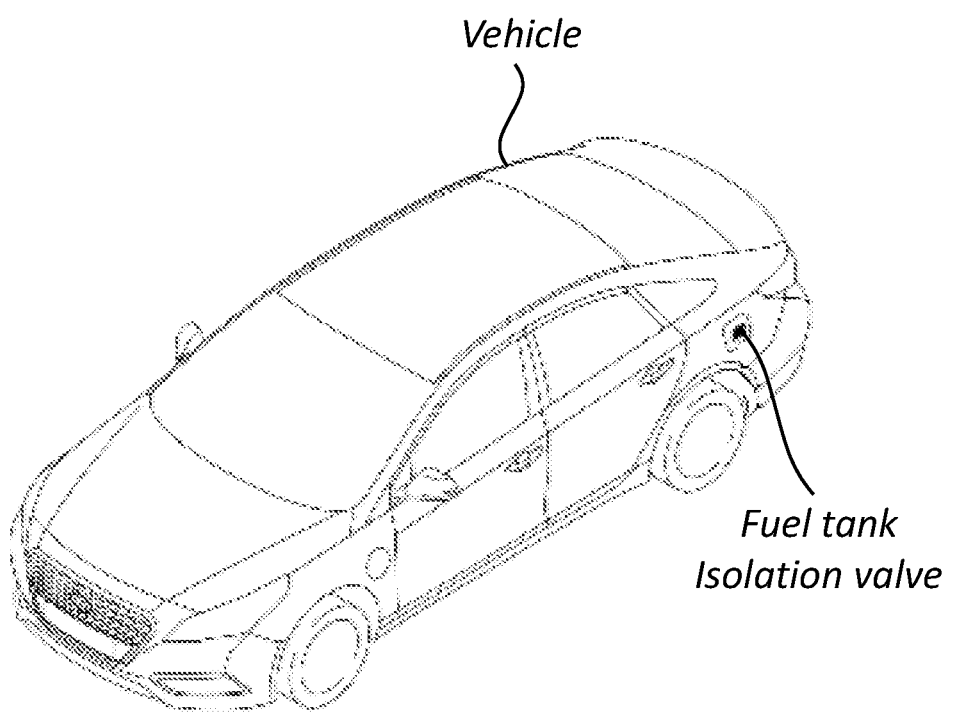
FIG. 7 is a view illustrating a vehicle including the fuel tank isolation valve according to the present disclosure.

Meanwhile, although FIG. 5 illustrates as an example the case where the spring compression amount C1 is the same as a depth of the spring compression amount securing groove 16b, the spring compression amount C2 suitably may vary as shown in FIG. 6.

In preferred systems, the spring compression amount suitably may vary depending on various design elements such as a thickness of the guide 16, a length of the extension portion 15a of the first armature 15, a length of the first spring 41, a length of the second armature 23, a distance from the undersurface of the core 14 to the floor surface of the valve housing 21, etc. That is, the spring compression amount suitably may vary according to the design intent.

As described above, in the fuel tank isolation valve according to the present disclosure, there is minimal or preferably no clearance in the connection portion between the first armature 15 and the second armature 23 and the spring compression amount securing groove 16b is formed on the upper surface of the guide 16, so that a required compression amount can be secured as the first spring 41 is compressed by the guide 16 at the time of assembling the armature assembly into the valve.

In addition, since there is minimal or preferably no clearance between the first armature 15 and the second armature 23, it is possible to prevent or inhibit the first armature 15 from moving in the axial direction in a finished valve assembly state, and therefore, since the position of the first armature 15 in a valve-off state can be always or at least substantially constant, the magnitude of the effective magnetic force generated when the valve is on becomes constant. Accordingly, the operation of the valve can be effectively consistently stable and uniform.

Further, since a collision between the components does not occur at the connection portion between the first armature 15 and the second armature 23, damage to the components of the armatures and noise occurrence at least significantly can be inhibited or prevented.

Also, in the valve-off state, since the first armature 15 does not vibrate by vibration transmitted from the outside, noise caused by vibration, friction and consequent wear thereby can effectively be reduced or prevented.

While the present disclosure has been described above with reference to the exemplary embodiment depicted in the drawings, the exemplary embodiment is described just for illustration, and those skilled in the art will understand that various modifications of the exemplary embodiment and any other exemplary embodiment equivalent thereto are available. Accordingly, the true technical protection scope of the present disclosure should be determined by the appended claims.

REFERENCE NUMERALS

| | |
|---|---|
| 10: solenoid part | 11: solenoid housing |
| 12: coil | 13: bobbin |
| 14: core | 15: first armature |
| 16: guide | 16b: spring compression amount securing groove |
| 20: valve part | 21: valve housing |
| 22: outer cylinder member | 23: second armature |
| 24: cover | 25: relief valve |
| 41: first spring | 42: second spring |
| 43: third spring | |

What is claimed is:

1. A fuel tank isolation valve of a vehicle comprising:
a first armature pulled toward an inside of a core by an electromagnetic force generated when a current is supplied to a coil;
a second armature connected to the first armature thus operating in a same direction as the first armature, and configured to open and close a flow path,
wherein the first armature and the second armature are connected so that there is no clearance in an axial direction; and
a guide and a first spring provided between the first armature and the second armature to form an armature assembly;
wherein the first spring is compressed by being supported at both ends thereof by the guide and the second armature, and a spring compression amount securing groove is formed on an upper surface of the guide; and
wherein the armature assembly is in such a manner that, before assembled inside the fuel tank isolatio valve, an undersurface of a body of the first armature is in contact with a floor surface of the spring compression amount securing groove, and, when assembled inside the fuel tank isolation valve, the guide further compresses the first spring by moving toward the second armature while being in contact with the core.

2. The fuel tank isolation valve of a vehicle of claim 1, wherein the second armature is inserted into an outer cylinder member, and the outer cylinder member is inserted into a valve housing and supported in the axial direction by a second spring.

3. The fuel tank isolation valve of a vehicle of claim 2, wherein a connection portion in a cylindrical shape is formed on an upper surface of the second armature, an opening hole is formed in a side surface of the connection portion, a flow hole is formed through the upper surface of the second armature, a flow hole is formed through a cover coupled to a lower end of the second armature, and a flow hole is formed through a floor surface of the outer cylinder member.

4. The fuel tank isolation valve of a vehicle of claim 1, wherein the second armature is formed in a cylindrical shape, a flow path passing through the second armature is formed, and a relief valve is installed inside the second armature.

5. The fuel tank isolation valve of a vehicle of claim 4, wherein a number of protrusions are formed along a circumferential surface on an outer peripheral surface of the relief valve, a gap is formed between the outer peripheral surface of the relief valve and an inner peripheral surface of the second armature by the protrusions, so that fuel evaporation gas passes through the gap.

6. A vehicle comprising a fuel tank isolation valve of claim 1.

7. A fuel tank isolation valve of a vehicle comprising:
a first armature pulled toward an inside of a core b an electromagnetic force generated when a current is supplied to a coil; and
a second armature connected to the first armature thus operating in a same direction as the first armature, and configured to open and close a flow path,
wherein the first armature and the second armature are connected so that there is no clearance in an axial direction;
wherein an extension portion is formed on a body of the first armature, a neck portion that is reduced in diameter is formed at an end of the extension portion, and a catching end in that is expanded again in diameter is formed at an end of the neck portion,
wherein a connection portion in a cylindrical shape is formed on an upper surface of the second armature, and a connection hole is formed in an upper plate of the connection portion,
wherein the first armature and the second armature are connected to each other in a state where the neck portion penetrates the connection hole and the catching end is caught by an undersurface of the upper plate of the connection portion, and
wherein lengths in the axial direction of the neck portion and the upper plate are the same, so that there is no clearance in the axial direction in the connection portion of the first armature and the second armature.

* * * * *

UNITED STATES PATENT AND TRADEMARK OFFICE
CERTIFICATE OF CORRECTION

| | |
|---|---|
| PATENT NO. | : 11,913,566 B2 |
| APPLICATION NO. | : 17/940155 |
| DATED | : February 27, 2024 |
| INVENTOR(S) | : Du Seok Lee |

It is certified that error appears in the above-identified patent and that said Letters Patent is hereby corrected as shown below:

On the Title Page

Item (54), please correct the title to read as follows:
FUEL TANK ISOLATION VALVE OF VEHICLE In the Specification At Column 1, please correct the title to read as follows:
FUEL TANK ISOLATION VALVE OF VEHICLE Signed and Sealed this
Twenty-third Day of April, 2024

Katherine Kelly Vidal
*Director of the United States Patent and Trademark Office*